(12) United States Patent
Ma et al.

(10) Patent No.: US 12,481,608 B2
(45) Date of Patent: Nov. 25, 2025

(54) TREE-BASED NETWORK ARCHITECTURE FOR ACCELERATING MACHINE LEARNING COLLECTIVE OPERATIONS

(71) Applicant: Google LLC, Mountain View, CA (US)

(72) Inventors: Xiaoyu Ma, Newark, CA (US); David Patterson, Albany, CA (US)

(73) Assignee: Google LLC, Mountain View, CA (US)

( * ) Notice: Subject to any disclaimer, the term of this patent is extended or adjusted under 35 U.S.C. 154(b) by 72 days.

(21) Appl. No.: 18/411,299

(22) Filed: Jan. 12, 2024

(65) Prior Publication Data

US 2025/0231893 A1    Jul. 17, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC .............. G06F 13/20; G06F 15/17362; G06F 15/17381; G06F 2213/40; G06N 20/00; G06N 20/20; G06N 3/045; G06N 3/0464; G06N 3/06; G06N 3/063; G06N 3/08; G06N 5/04; G06N 7/00; H04L 41/044; H04L 67/10; H04L 67/12
See application file for complete search history.

(56) References Cited

U.S. PATENT DOCUMENTS

| | | |
|---|---|---|
| 8,965,203 B1 | 2/2015 | Vahdat et al. |
| 9,042,404 B2 | 5/2015 | Duwel et al. |
| 9,147,672 B1 | 9/2015 | Chen |
| 9,923,766 B2 | 3/2018 | Palmer et al. |
| 10,303,398 B2 | 5/2019 | Wuu et al. |
| 10,416,999 B2 | 9/2019 | Fleming et al. |
| 10,803,548 B2 | 10/2020 | Matam et al. |
| 10,929,325 B2 | 2/2021 | Krishnan et al. |
| 11,043,472 B1 | 6/2021 | Dokania et al. |
| 11,061,761 B2 | 7/2021 | Iyer et al. |
| 11,120,026 B1 | 9/2021 | Mostak |

(Continued)

FOREIGN PATENT DOCUMENTS

CN    114926318 A    8/2022

OTHER PUBLICATIONS

International Search Report and Written Opinion for PCT Application No. PCT/US2023/03578 dated Feb. 16, 2024. 20 pages.

(Continued)

*Primary Examiner* — Christopher Biagini
(74) *Attorney, Agent, or Firm* — Lerner David LLP

(57) ABSTRACT

Aspects of the disclosure are directed to a tree-based network architecture for serving and/or training machine learning models. The architecture includes one or more multi-chip packages having a plurality of compute-memory stacks connected via an input/output (I/O) die. The I/O die includes an aggregator to aggregate computations from the compute-memory stacks. The architecture can further include a plurality of the multi-chip packages connected on a server via a server level aggregator and a plurality of the servers connected on a rack via a rack level aggregator for further aggregation of the computations from the compute-memory stacks. The tree-based network architecture allows for fewer hops, resulting in lower latency and savings in bandwidth when serving and/or training machine learning models.

20 Claims, 9 Drawing Sheets

(56) References Cited

U.S. PATENT DOCUMENTS

| | | | |
|---|---|---|---|
| 11,309,246 B2 | 4/2022 | Dabral et al. | |
| 11,328,222 B1* | 5/2022 | Matthews | H04L 47/32 |
| 11,456,281 B2* | 9/2022 | Li | H01L 25/50 |
| 11,490,177 B1 | 11/2022 | Gallagher et al. | |
| 11,836,102 B1* | 12/2023 | Mathuriya | H01L 25/18 |
| 12,306,777 B1* | 5/2025 | Koh | G06F 13/28 |
| 2010/0078790 A1 | 4/2010 | Ito et al. | |
| 2014/0201405 A1 | 7/2014 | Thomas et al. | |
| 2019/0050325 A1 | 2/2019 | Malladi et al. | |
| 2020/0328192 A1 | 10/2020 | Zaman et al. | |
| 2021/0073449 A1* | 3/2021 | Segev | G06F 30/27 |
| 2021/0117249 A1 | 4/2021 | Doshi et al. | |
| 2021/0159110 A1 | 5/2021 | Or-Bach et al. | |
| 2021/0241078 A1* | 8/2021 | Han | G06N 3/04 |
| 2021/0311634 A1 | 10/2021 | Chang et al. | |
| 2022/0092479 A1* | 3/2022 | Shin | H04L 67/10 |
| 2022/0337481 A1 | 10/2022 | Guim Bernat et al. | |
| 2023/0005905 A1 | 1/2023 | Clark | |
| 2023/0009881 A1 | 1/2023 | Chapman et al. | |
| 2023/0094030 A1 | 3/2023 | Jha et al. | |
| 2023/0297269 A1* | 9/2023 | Dally | G06F 3/0679 711/154 |

OTHER PUBLICATIONS

Extended European Search Report for European Patent Application No. 24206191.9 dated Mar. 31, 2025. 10 pages.

Lao et al. ATP: In-network Aggregation for Multi-tenant Learning. USENIX, USENIX, The Advanced Computing Systems Association, Sep. 14, 2021 (Sep. 14, 2021), pp. 1-22, XP061067560, Retrieved from the Internet: <http://www.usenix.org/system/files/nsdi21-lao.pdf>.

Sharma et al. SWAP: A Server-Scale Communication-Aware Chiplet-Based Manycore PIM Accelerator. IEEE Transactions on Computer-Aided Design of Integrated Circuits and Systems, IEEE, USA, vol. 41, No. 11, Aug. 8, 2022 (Aug. 8, 2022), pp 4145-4156, XP011925212, ISSN: 0278-0070, DOI: 10.1109/TCAD.2022.3197500.

* cited by examiner

TREE-BASED NETWORK ARCHITECTURE FOR ACCELERATING MACHINE LEARNING COLLECTIVE OPERATIONS

BACKGROUND

Computing packages can be connected in a torus arrangement for communication between processors when processing data, such as for serving and/or training machine learning models like large language models (LLMs). However, network bottlenecks in the torus arrangement can occur due to the increasing number of hops, resulting in increased latency when serving and/or training the machine learning models.

BRIEF SUMMARY

Aspects of the disclosure are directed to a tree-based network architecture for serving and/or training machine learning models. The architecture includes one or more chip packages each having one or more compute-memory units connected via a chip level aggregator, if more than one compute-memory unit, to aggregate computations from the compute-memory units. The architecture can further include a plurality of the chip packages connected on a server via a server level aggregator and a plurality of the servers connected on a rack via a rack level aggregator for further aggregation of the computations from the compute-memory units. The tree-based network architecture allows for fewer hops, resulting in lower latency and savings in bandwidth when serving and/or training machine learning models.

An aspect of the disclosure provides for a tree-based network architecture including: a server including a plurality of multi-chip packages connected to a server level aggregator; the multi-chip packages each including a plurality of compute-memory stacks connected to an input/output (I/O) die, each I/O die configured to aggregate computations performed by the compute-memory stacks to generate a chip level aggregated computation and output the chip level aggregated computation to the server level aggregator; and the server level aggregator configured to aggregate the chip level aggregated computation from each of the plurality of multi-chip packages to generate a server level aggregated computation and output the server level aggregated computation.

In an example, the architecture further includes a rack including the server and a plurality of additional servers connected to a rack level aggregator, the rack level aggregator configured to aggregate the server level aggregated computation from the server and each of the plurality of additional servers to generate a rack level aggregated computation and output the rack level aggregated computation. In another example, the server level aggregated computation is output to at least one of the plurality of compute-memory stacks. In yet another example, the server level aggregated computation is output to an additional server.

In yet another example, a compute-memory stack of the plurality of compute-memory stacks includes a plurality of memory die stacked on top of a compute die. In yet another example, a multi-chip package of the plurality of multi-chip packages includes a spare compute-memory stack. In yet another example, the server level aggregator includes a plurality of downstream ports and an upstream port. In yet another example, the number of the plurality of downstream ports corresponds to the number of the multi-chip packages. In yet another example, the server level aggregator further includes a spare downstream port and a spare upstream port.

In yet another example, the server level aggregator is configured to perform at least one of an all-reduce, reduce, reduce-scatter, broadcast, multi-cast, or barrier operation to aggregate the chip level aggregated computation. In yet another example, the I/O dies are packaged with the server level aggregator.

In yet another example, the computations performed by the compute-memory stacks are for at least one of serving or training a machine learning model. In yet another example, the machine learning model is a large generative model.

Another aspect of the disclosure provides for a method for processing computations in a tree-based network architecture, the method including: computing, by each of a plurality of compute-memory stacks in a multi-chip package, a respective computation; aggregating, by an input/output (I/O) die connected to the plurality of compute-memory stacks in the multi-chip package, the respective computations to generate a chip level aggregated computation; aggregating, by a server level aggregator in a server, the chip level aggregated computation with additional chip level aggregated computations to generate a server level aggregated computation; and outputting, by the server level aggregator, the server level aggregated computation.

In an example, the method further includes: aggregating, by a rack level aggregator in a rack, the server level aggregated computation with additional server level aggregated computations to generate a rack level aggregated computation; and outputting, by the rack level aggregator, the rack level aggregated computation. In another example, the method further includes outputting the server level aggregated computation to at least one of the plurality of compute-memory stacks. In yet another example, the method further includes outputting the server level aggregated computation to an additional server. In yet another example, aggregating the respective computations to generate a chip level aggregated computation includes performing at least one of an all-reduce, reduce, reduce-scatter, broadcast, multi-cast, or barrier operation.

Yet another aspect of the disclosure provides for a large generative model being at least one of served or trained by one or more tree-based network architectures, each of the tree-based network architectures including: a server including a plurality of multi-chip packages connected to a server level aggregator; the multi-chip packages each including a plurality of compute-memory stacks connected to an input/output (I/O) die, each I/O die configured to aggregate computations performed by the compute-memory stacks to generate a chip level aggregated computation and output the chip level aggregated computation to the server level aggregator; and the server level aggregator configured to aggregate the chip level aggregated computation from each of the plurality of multi-chip packages to generate a server level aggregated computation and output the server level aggregated computation.

In an example, each of the tree-based network architectures further includes a rack including the server and a plurality of additional servers connected to a rack level aggregator, the rack level aggregator configured to aggregate the server level aggregated computation from the server and each of the plurality of additional servers to generate a rack level aggregated computation and output the rack level aggregated computation.

DETAILED DESCRIPTION

Figure 1:
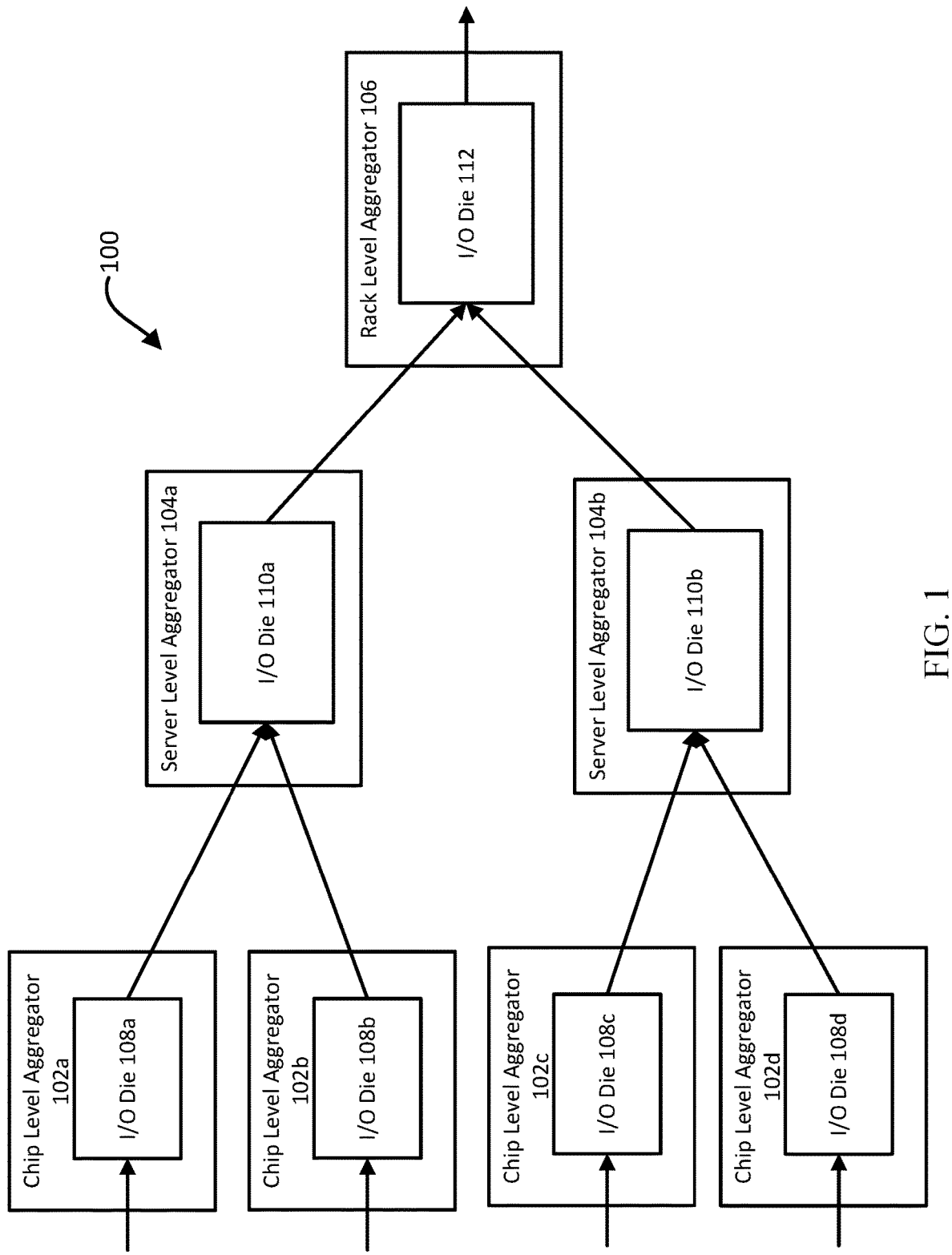
FIG. 1 depicts a block diagram of an example tree-based network architecture for serving and/or training machine learning models according to aspects of the disclosure.

The technology relates generally to tree-based network architecture for serving and/or training machine learning models, such as large language models (LLMs), large foundation models (LFMs), large graphic models (LGMs), and/or any other large generative model. The architecture includes a plurality of multi-chip packages, each having a plurality of compute-memory stacks connected via an input/output (I/O) die. The compute-memory stacks can each include a compute die stacked under a plurality of memory dies. The I/O die can be included as part of a chip level aggregator to aggregate computations from the compute-memory stacks. Alternatively, or additionally, the architecture can include a plurality of single-chip packages, or more generally, chip packages. It should be noted that, while the remaining description is explained with respect to multi-chip packages, the same description is generally applicable to single-chip packages or a combination of single- and multi-chip packages as well. The plurality of multi-chip packages can further be connected on a server via a server level aggregator and a plurality of servers can be connected on a rack via a rack level aggregator for further aggregation of the computations from the compute-memory stacks. The tree-based network architecture allows for fewer hops, resulting in lower latency and savings in bandwidth when serving and/or training machine learning models.

A multi-chip package can include a plurality of compute-memory stacks connected through an I/O die. The multi-chip package can further include one or more spare compute-memory stacks. For example, the multi-chip package can include 8 compute-memory stacks and a spare compute-memory stack connected to the I/O die, though any number of compute-memory stacks and spares can be connected to the I/O die. The compute-memory stacks can be connected to the I/O die via respective connections, such as UCIe. Alternatively, or additionally, a multi-chip package can include a plurality of compute-memory units. The plurality of compute-memory units may be connected through an I/O die or the plurality of compute-memory unit may form a single die where the single die is connected to an aggregator. A compute-memory unit can include a compute die connected to one or more memory dies, such as via UCIe. The multi-chip package can further include one or more spare compute-memory units. It should be noted that, while the remaining description is explained with respect to compute-memory stacks, the same description is generally applicable to the compute-memory units as well.

An I/O die for aggregation can be packaged with an aggregator card, such as a PCIe card. The aggregator card can include a plurality of downstream ports and an upstream port. The number of downstream ports can correspond to the number of compute-memory stacks in the multi-chip package. For example, if the multi-chip package includes 8 compute-memory stacks and a spare stack, the aggregator card can include 8 downstream ports and a spare port. The aggregator card can also include a spare upstream port. The aggregator card can aggregate computations from the compute-memory stacks using an aggregation operation, such as all-reduce, reduce, reduce-scatter, broadcast, multi-cast, and/or barrier. The aggregator card can be used for chip level, server level, and/or rack level aggregation.

Aggregation can occur from chip to server to rack for serving and/or training machine learning models. For example, for an all-reduce operation, each compute-memory stack computes a computation, such as a shard representing a partial sum, and sends the computation to a chip level I/O die for a chip level aggregation. The chip level I/O die generates a chip level aggregated computation, such as a chip level sum at each multi-chip package. Each multi-chip package sends their chip level aggregated computation to a server level aggregator. The server level aggregator generates a server level aggregated computation, such as a server level sum. Each server sends their server level aggregated computation to a rack level aggregator. The rack level aggregator generates a rack level aggregated computation, such as a rack level sum. This process continues until a root aggregator is reached. The root aggregator can be a rack level aggregator or a server level aggregator depending on the overall architecture. The root aggregator generates a global computation, such as a global sum, for broadcast. The root aggregator can broadcast the global computation back to the compute-memory stacks or to another architecture for further processing.

FIG. 1 depicts a block diagram of an example tree-based network architecture 100 for serving and/or training machine learning models. For example, the tree-based network architecture 100 can serve and/or train large generative models, e.g., LLMs, LFMs, and/or LGMs by aggregating computations from chip level to server level to rack level. Aggregating the computations can result in fewer hops, for instance compared to torus network architectures, resulting in lower latency and savings in bandwidth.

The tree-based network architecture 100 can include a plurality of chip level aggregators 102, e.g., 102*a-d*, a plurality of server level aggregators 104, e.g., 104*a-b*, and one or more rack level aggregators 106. While 4 chip level aggregators 102, 2 server level aggregators 104, and one rack level aggregator 106 are depicted in FIG. 1, the tree-based network architecture 100 can include any number of chip level aggregators 102, server level aggregators 104, and rack level aggregators 106. Further, while 3 levels of aggregation, e.g., chip, server, rack, are depicted in FIG. 1, the tree-based network architecture 100 can include any number of level of aggregation, such as including one or more levels of chips, one or more levels of servers, and/or one or more levels of racks. The chip level aggregators 102 can be connected to the server level aggregators 104 and/or the server level aggregators 104 can be connected to the rack level aggregator 106 via peripheral component interconnect express (PCIe) or low latency serialization/deserialization (SerDes) connections, such as remote direct memory access (RDMA) over converged ethernet (RoCE) or inter-core interconnects (ICI).

The chip level aggregators 102 are associated with multi-chip packages, the server level aggregators 104 are associated with servers, and the rack level aggregator 106 is associated with a rack. The chip level aggregators 102 aggregate computations from a plurality of compute-memory stacks of each multi-chip package via a chip level input/output (I/O) dies 108, e.g., 108a-d, to generate chip level aggregated computations. The server level aggregators 104 aggregate the chip level computations from a plurality of multi-chip packages via server level I/O dies 110, e.g., 110a-b, to generate server level aggregated computations. The rack level aggregator 106 aggregates the server level computations from a plurality of servers via a rack level I/O die 112 to generate a rack level aggregated computation. The rack level aggregator 106 can send the rack level aggregated computation back to one or more of the compute-memory stacks through the chip level I/O dies 108. Alternatively, or additionally, the rack level aggregator 106 can send the rack level aggregated computation to another network architecture.

Figure 2:
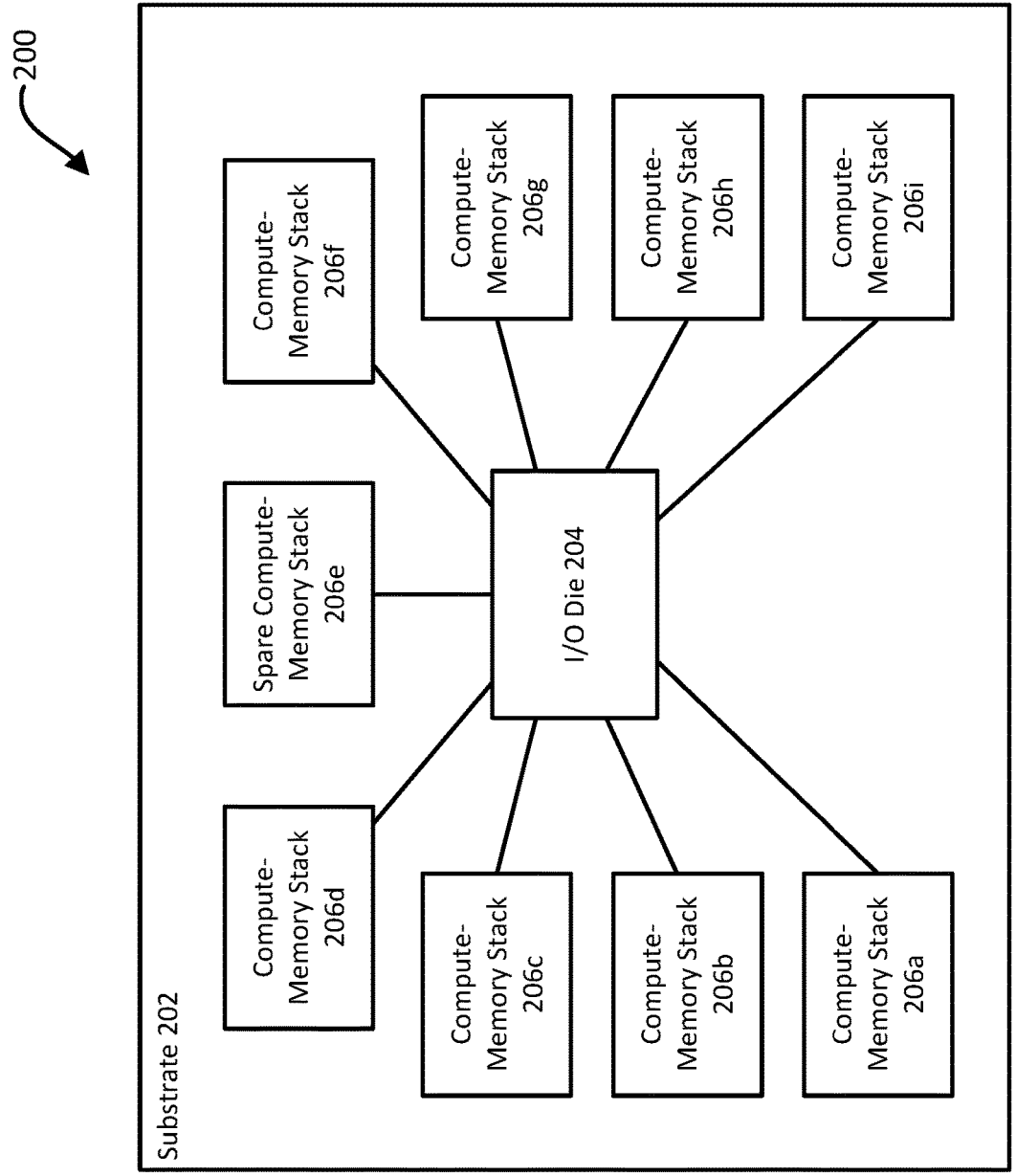
FIG. 2 depicts a block diagram of an example multi-chip package in a tree-based network architecture according to aspects of the disclosure.

FIG. 2 depicts a block diagram of an example multi-chip package 200 for aggregation. The multi-chip package 200 can operate as a hardware accelerator, such as for serving and/or training machine learning models. The multi-chip package 200 can include a substrate 202, such as a circuit board, on which an I/O die 204 and a plurality of compute-memory stacks 206, e.g., 206a-i, are located. The I/O 204 can correspond to any of the chip level I/O dies 108 as depicted in FIG. 1. The multi-chip package 200 can include any number of compute-memory stacks 206. For example, FIG. 2 depicts 9 compute-memory stacks 206, with 8 compute-memory stacks in operation and an additional compute-memory stack as a spare.

The I/O die 204 can be connected to the plurality of compute-memory stacks 206 on the substrate 202 without an interposer. The I/O die 204 can be connected to the plurality of compute-memory stacks 206 via chiplet connections, such as universal chiplet interconnect express (UCIe). The I/O die 204 can connect to other I/O dies (not shown), such as server level I/O dies via connections, such as PCIe or low latency SerDes connections, for operating as a hardware accelerator that is part of a large model processing unit server. Aggregation can occur at the I/O die 204, such as via an all-reduce function, with fewer hops and lower latency than if the multi-chip package was configured in a torus arrangement.

The compute-memory stacks 206 can be chiplets, each including a 3-dimensional stack of a compute die and a plurality of memory dies. For example, the compute-memory stacks 206 can be capable of transmitting and/or receiving 820 Gb/s. The compute-memory stacks 206 can include the compute die stacked under the plurality of memory dies. Each of the compute-memory stacks 206 can have the same or a different number of memory dies stacked above the compute die.

Figure 3:
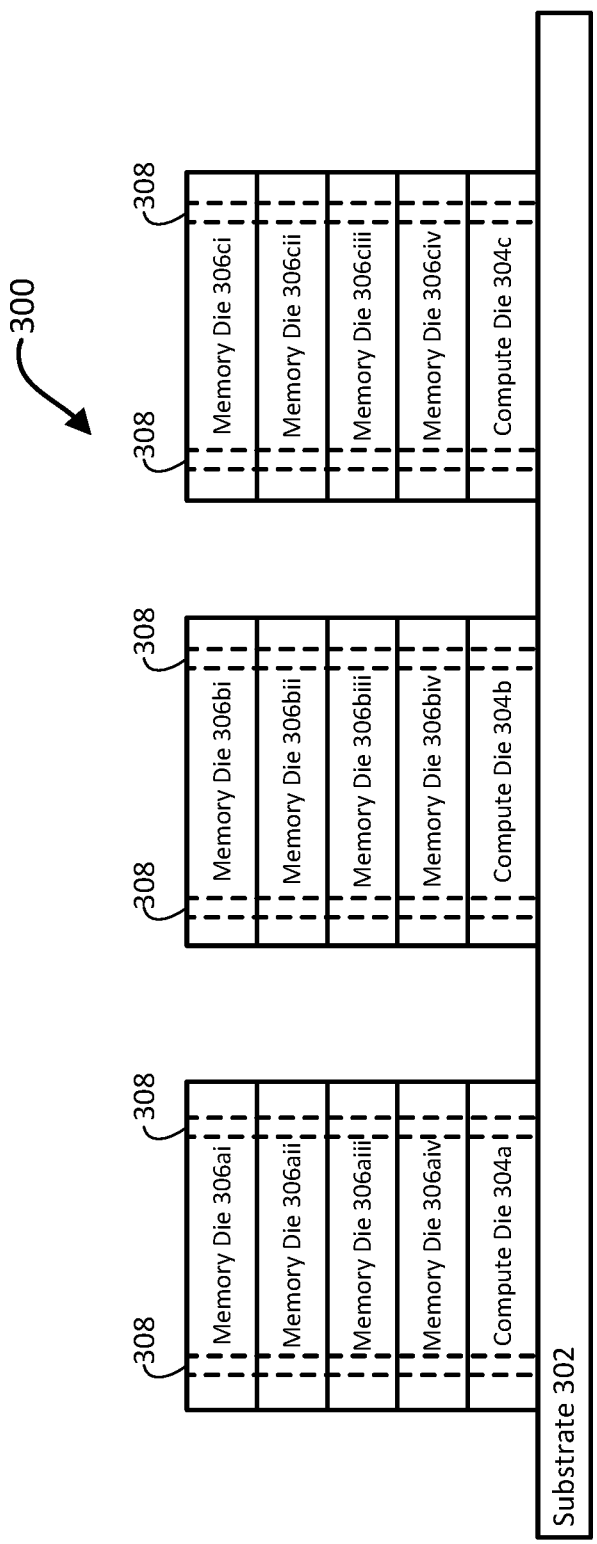
FIG. 3 depicts a block diagram of a partial side view of an example multi-chip package according to aspects of the disclosure.

FIG. 3 depicts a block diagram of a partial side view of an example multi-chip package 300. The multi-chip package 300 can correspond to the multi-chip package 200 as depicted in FIG. 2. The multi-chip package 300 can include a substrate 302 with a plurality of compute-memory stacks electrically connected to the substrate. While three compute-memory stacks are depicted in FIG. 3, the multi-chip package 300 can include any number of compute-memory stacks. Each compute memory stack can include a compute die 304, e.g., 304a-c, stacked under a plurality of memory dies 306, e.g., 306ai-civ. The compute dies 304 can be stacked under any number of memory dies 306. Within each compute-memory stack, the compute die 304 can be connected to the plurality of memory dies 306 via internal connections 308, such as through silicon vias (TSVs), that extend through each compute-memory stack.

The compute dies 304 can be low-power compute dies and the memory dies 306 can be high bandwidth memory (HBM) dies, such as dynamic random access memory (DRAM) dies. The number of compute-memory stacks and the number of memory dies stacked in each compute-memory stack can vary based on the capacity for a given application, as well as the total number of chiplets included in the multi-chip package 300. Particularly, fewer memory dies 306 may be required per stack when a larger number of compute dies 304 are used. As such, an increase in the number of compute dies 304 can reduce the height of the multi-chip package 300, resulting in a reduction of thermal constraint and cooling requirements present if a larger stack of memory dies were used. Further, since each compute-memory stack contains its own compute die 304, the compute-memory stacks can be designed with smaller compute dies than would be required if only a single compute die was used for all of the memory dies within the package.

The compute dies 304 can be designed to have the same or less footprint on the substrate 302 as the memory dies 306. For example, as depicted in FIG. 3, the compute dies 304 have the same footprint as the memory dies 306 with which they are stacked. As another example, the compute dies 304 may have a footprint less than 30% larger than the footprint of the memory dies 306 with which they are stacked. This can allow for accommodating a larger number of smaller, lower-power compute-memory stacks, resulting in lower arithmetic intensity when serving and/or training machine learning models. Further, the compute-memory stacks are directly connected to the substrate 302 via the I/O die (not shown) without requiring the use of an interposer.

Referring back to FIG. 2, as an example, the multi-chip package 200 may have a length and width relative to a substrate of about 60 mm by 60 mm, the compute-memory stacks 206 may have a footprint of about 100 mm$^2$ and the I/O die 204 may have a footprint of about 150 mm$^2$. The memory dies in the compute-memory stacks 206 may be 3D-stacked dynamic random access memory (DRAM) dies with a bandwidth of around 800 GB/s, a capacity of around 4 GB, and a thermal design power (TDP) of around 10 W per die. The compute dies of the compute-memory stacks 206 may each have a thermal design power of around 40 W or less, with around 32 TFLOPS of processing and around 32 MB SRAM. The I/O die 204 may have a thermal design power of around 35 W TDP.

The multi-chip package 200 can enable high bandwidth communication between the I/O dies 204 and other I/O dies. As an example, the total I/O bandwidth per I/O die 204 may be up to several TB/s, e.g., up to 4 TB/s. For example, 400 GB/s of bandwidth may be dedicated to each compute die and 400 GB/s of bandwidth may be dedicated to the I/O die 204.

The multi-chip package 200 can be configured so that at least one compute-memory stack 206 is at least initially designated as a cold spare. For example, eight of the compute-memory stacks 206 may be designated as active while a ninth is designated as an inactive spare, though any number of spare compute-memory stacks may be utilized.

Accordingly, the I/O die 204 may only communicate with the active compute-memory stacks for the processing operations of the machine learning accelerator. However, the I/O die 204 may also be configured to receive and transmit diagnostic information regarding the operation of each compute-memory stack 206 to determine whether to replace any faulty compute-memory stacks with the spare compute-memory stack. For example, if compute-memory stack 206d is determined to have experienced a fault or is otherwise not operating correctly, then compute-memory stack 206d can be re-designated from being an active compute-memory stack to an inactive compute-memory stack while spare compute-memory stack 206i can be re-designated from being an inactive spare compute-memory stack to an active compute-memory stack. The use of spare compute-memory stacks allows for increased reliability such that a fault in any one compute-memory stack will not impair the operation of the machine learning accelerator as a whole.

The I/O dies 204 can contain lightweight compute for smart routing, such as aggregation of partial sums computed by the memory-compute stacks 206 connected to the I/O die 204. The multi-chip package 200 can be configured to operate where multiple levels of sharding are performed by distributing the processing to the various compute-memory stacks 206. For example, if a large model processing unit is sharded to 16 GB, the multi-chip package 200 can perform the sharding with each compute-memory stack 206 as a shard. This results in a memory capacity per shard that is smaller than the shard size.

Figure 4:
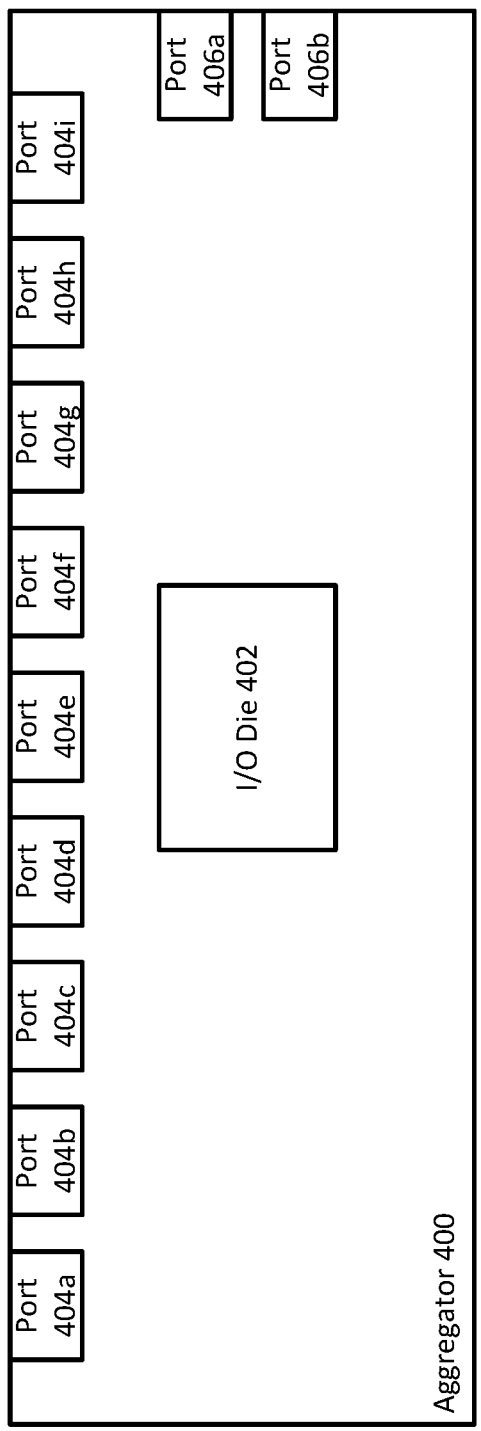
FIG. 4 depicts a block diagram of an example aggregator in a tree-based network architecture according to aspects of the disclosure.

FIG. 4 depicts a block diagram of an example aggregator 400. The aggregator can correspond to any of the chip level aggregator 102, server level aggregator, and/or rack level aggregator 106 as depicted in FIG. 1. The aggregator 400 can be an aggregator card, such as a PCIe card. The aggregator 400 can include an I/O die 402. For chip-level aggregation, the I/O die 402 can be the same I/O die used in the multi-chip package, but individually packaged in the aggregator card to serve as the aggregation processor.

The aggregator 400 can include a plurality of downstream ports 404, e.g., 404a-i, and one or more upstream ports 406, e.g., 406a-b. For chip level aggregation, the number of downstream ports 404 can correspond to the number of compute-memory stacks in the multi-chip package, as each downstream port 404 can be connected to a respective compute-memory stack. For server level aggregation, the number of downstream ports 404 can correspond to the number of multi-chip packages contained in the server, as each downstream port 404 can be connected to a respective multi-chip package. For rack level aggregation, the number of downstream ports 404 can correspond to the number of servers contained in the rack, as each downstream port 404 can be connected to a respective server. For example, if the multi-chip package includes 8 compute-memory stacks and a spare stack, the aggregator 400 can include 8 active downstream ports 404a-h and a spare downstream port 404i. The aggregator can include an upstream port 406 to transmit aggregated computations to the next level of aggregation, e.g., compute-memory stack to chip, chip to server, or server to rack.

The aggregator 400 can include one or more spare downstream ports and one or more spare upstream ports. Similar to the compute-memory stacks, the I/O die 402 may be configured to receive and transmit diagnostic information regarding the operation of each downstream and upstream port to determine whether to replace any faulty ports with spare ports.

The aggregator 400 can aggregate computations using an aggregation operation, such as all-reduce, reduce, reduce-scatter, broadcast, multi-cast, and/or barrier. All-reduce may refer to each node sending a partial sum that is aggregated to compute a global sum that is then distributed to all of the nodes. Node here may refer to the compute-memory stacks, multi-chip packages, servers, or racks depending on the level of aggregation. Reduce may refer to each node sending a partial sum that is aggregated to compute a global sum that is then distributed to one or more nodes. Reduce-scatter may refer to each node sending a partial sum that is aggregated to compute a global sum that is then sharded, with each shard sent to one of the nodes. Broadcast may refer to a node sending a value, e.g., a partial or global sum, to another node. Multicast may refer to a node sending a value to a selected set of nodes. Barrier may refer to the nodes stalling computations to wait for a signal to complete.

For example, each compute-memory stack can compute a shard representing a partial sum and can send the partial sum to the I/O die of a chip level aggregator for aggregation. The I/O die can aggregate the partial sums via a reduce operation to generate a chip level aggregated sum and can send the chip level aggregated sum to the I/O die of a server level aggregator for further aggregation. The I/O can aggregate the chip level aggregated sum via a reduce operation to generate a server level aggregated sum and can send the server level aggregated sum to the I/O die of a rack level aggregator or another server level aggregator for further aggregation. This process can continue until the root aggregator is reached. The I/O die of the root aggregator can generate a global sum via a reduce operation and can send the global sum back to one or more of the compute-memory stacks or to another network for further processing. With aggregation, the I/O bandwidth can be reduced by the number of elements being aggregated after each hop, e.g., 8 times for an 8 to 1 aggregation.

Figure 5:
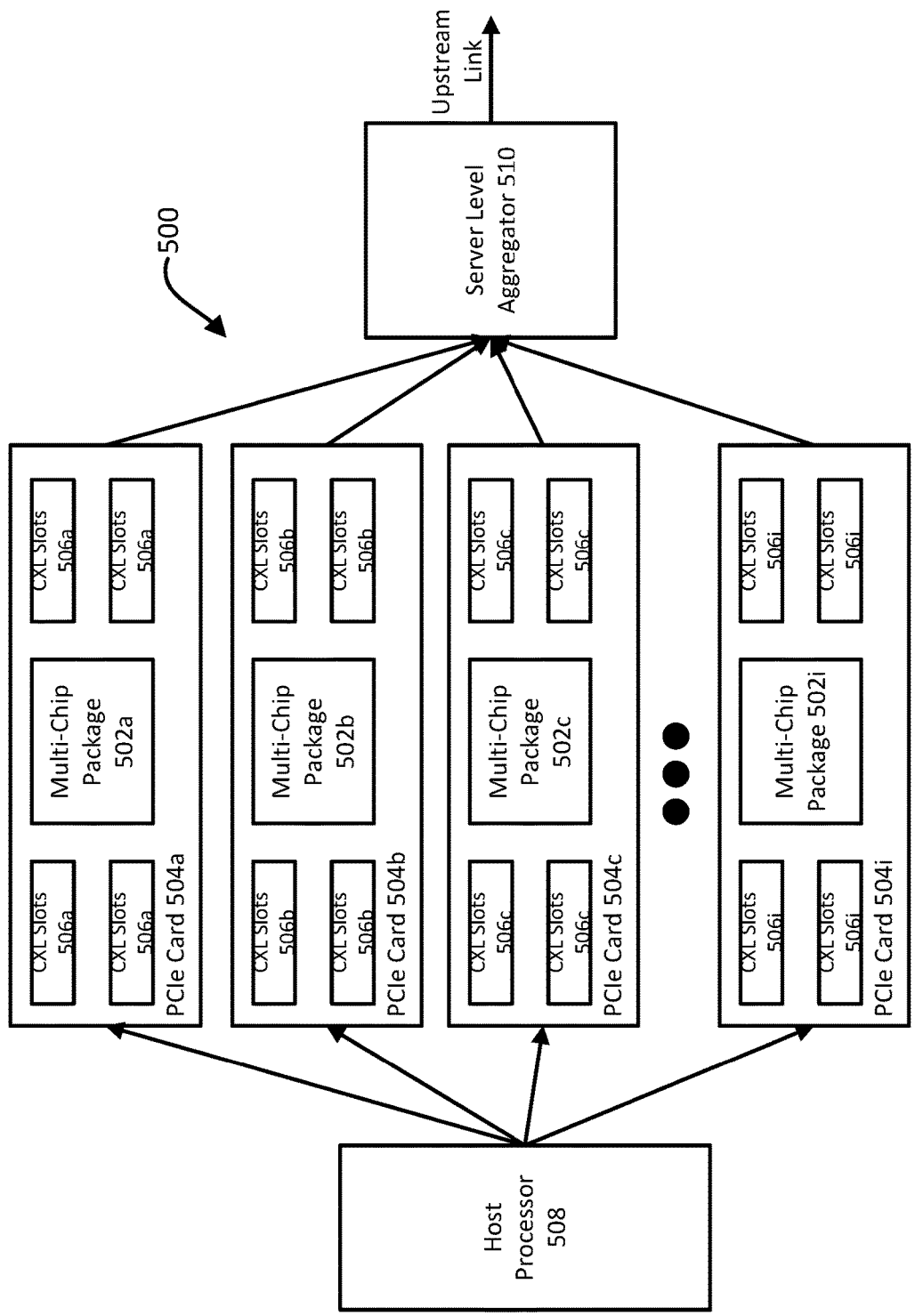
FIG. 5 depicts a block diagram of an example server in a tree-based network architecture according to aspects of the disclosure.

FIG. 5 depicts a block diagram of an example server 500 for aggregation. The server 500 can include a plurality of multi-chip packages 502, e.g., 502a-i, that operate individually or in conjunction as hardware accelerators, such as for serving and/or training machine learning models. The multi-chip packages 502 can correspond to the multi-chip package 200 as depicted in FIG. 2. The server 500 can include any number of multi-chip packages 502, such as 8 plus 1 spare, though 4 are depicted in the figure due to space constraints. The multi-chip packages 502 can each respectively be part of a chip level aggregator card 504, e.g., 504a-i, such as a PCIe card. The chip level aggregator cards 504 can further include external connections 506, e.g., 506a-i, such as compute express links (CXLs), to enable connections to other processing or memory peripherals, such as CXL-dual in-line memory modules (CXL-DIMMs), micro-processing units (MPUs), tensor processing units (TPUs), and other solid-state drives (SSDs).

As an example, one chip level aggregator card 504 can include a multi-chip package 502 configured for 256 TFLOPs, 6.5 TB/s, and 64 GB. Therefore, for a server 500 containing 8 chip level aggregator cards and 1 spare aggregator card, the server 600 can include 9 multi-chip packages 502 configured for 2 PFLOPs, 50 TB/s, and 600 GB.

The server 500 can further include a host processor 508 for managing the chip level aggregator cards 504. The host processor 508 can execute instructions from memory (not shown), such as to serve and/or train machine learning models, via computations performed by the compute-memory stacks of the multi-chip packages. Example host processors 508 can include one or more central processing unit (CPUs), graphic processing units (GPUs), field-programmable gate arrays (FPGAs), and/or application-specific integrated circuits (ASICs), such as tensor processing units (TPUs). The host processor 508 can be connected to the chip level aggregator cards 504 via PCIe connections.

The server 500 can also include a server level aggregator 510 for aggregating the computations from the multi-chip packages 502. The server level aggregator 510 can be connected to the chip level aggregator cards 504 via low latency SerDes connections, such as RoCE or ICI. The server level aggregator 510 can receive chip level aggregated computations from the multi-chip packages 502 and generate a server level aggregated computation, such as via an all-reduce operation.

Figure 6:
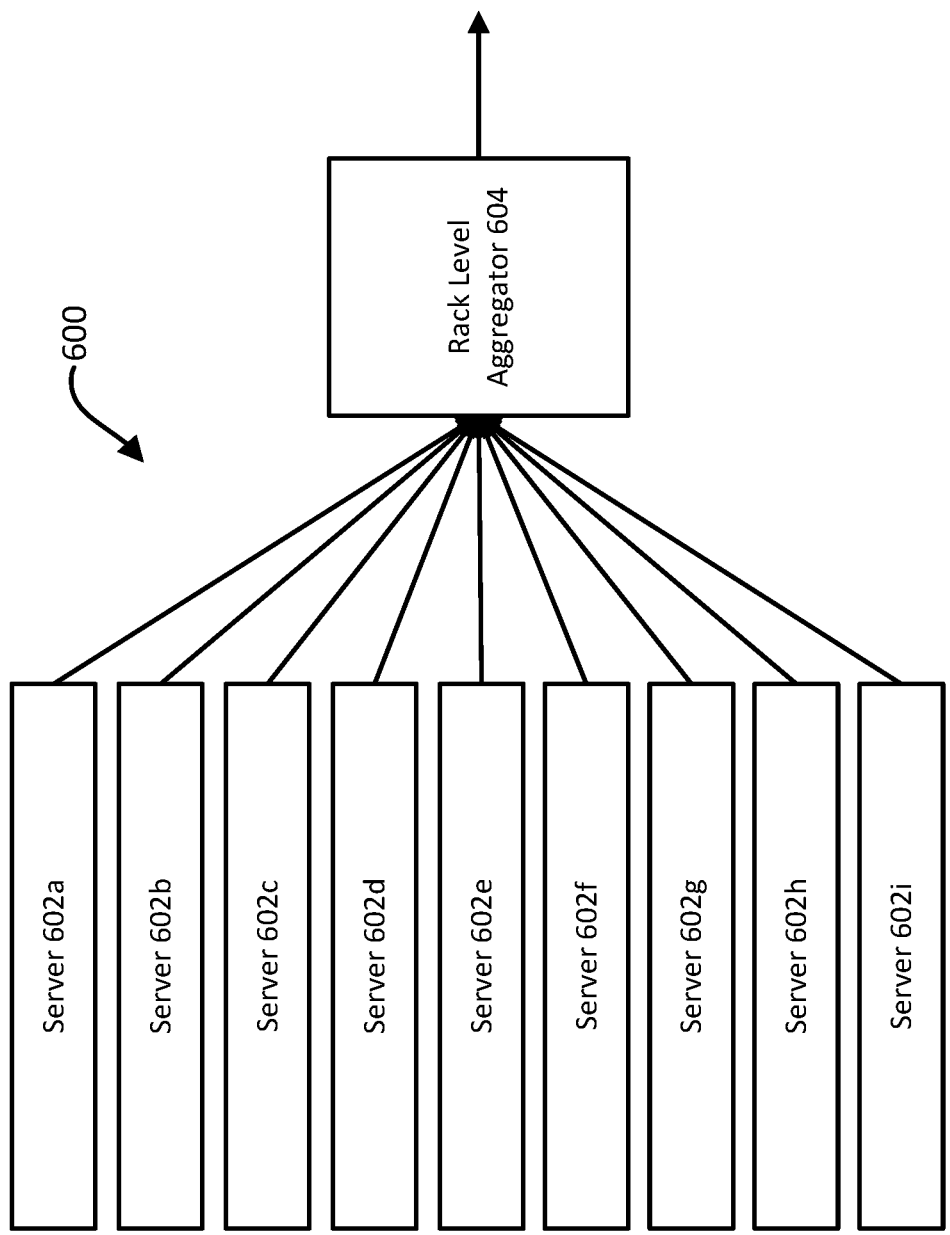
FIG. 6 depicts a block diagram of an example rack in a tree-based network architecture according to aspects of the disclosure.

FIG. 6 depicts a block diagram of an example rack 600 for aggregation. The rack 600 can include a plurality of servers 602, e.g., 602*a-i*, that each contain one or hardware accelerators for serving and/or training machine learning models. The servers 602 can correspond to the server 500 as depicted in FIG. 5. The rack 600 can include any number of servers 602, such as 8 plus 1 spare. Based on the prior example of the chip level aggregator card, a rack containing 9 servers 602 can include 81 multi-chip packages configured for 20 PFLOPs, 500 TB/s, and 5 TB.

The rack 600 can also include a rack level aggregator 604 for aggregating the computations from the servers 602. The rack level aggregator 604 can be connected to the servers 602 via low latency SerDes connections, such as ROCE or ICI. The server level aggregator 604 can receive server level aggregated computations from the servers 602 and generate a rack level aggregated computation, such as via an all-reduce operation. The rack level aggregated computation can be a global sum if the rack level aggregator 604 is a root aggregator.

Figure 7:
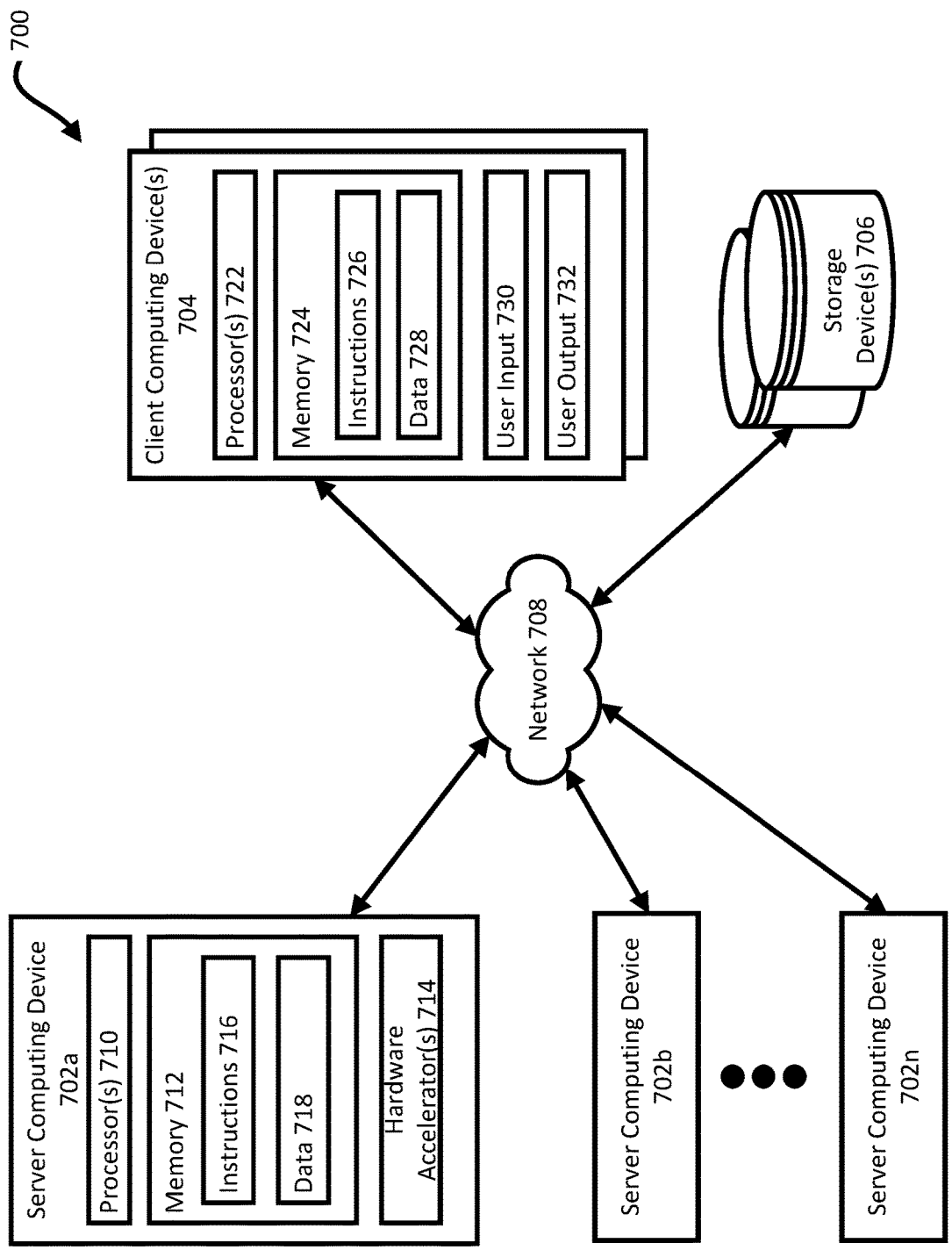
FIG. 7 depicts a block diagram of an example environment to implement a tree-based network architecture according to aspects of the disclosure.

FIG. 7 depicts a block diagram of an example environment 700 to implement a tree-based network architecture, such as the network architecture 100 as depicted in claim 1 for serving and/or training machine learning models. For example, the environment can be one or more data centers that provide computing resources for performing software applications associated with machine learning. The tree-based network architecture can be implemented on one or more devices having one or more processors in one or more locations, such as in a plurality of server computing devices 702*a-n* and one or more client computing devices 704. The server computing devices 702*a-n* can correspond to the servers as depicted in FIGS. 5-6, where one or more of the server computing devices can be implemented in a rack. The plurality of server computing devices 702 and the client computing device 704 can be communicatively coupled to one or more storage devices 706 over a network 708. The storage devices 706 can be a combination of volatile and non-volatile memory and can be at the same or different physical locations than the computing devices 702, 704. For example, the storage devices 706 can include any type of non-transitory computer readable medium capable of storing information, such as a hard-drive, solid state drive, tape drive, optical storage, memory card, ROM, RAM, DVD, CD-ROM, write-capable, and read-only memories.

The server computing devices 702 can each include one or more processors 710, memory 712, and hardware accelerators 714. The hardware accelerators 714 can correspond to one or more multi-chip packages, such as the multi-chip package 200 as depicted in FIG. 2. The processors 710 can be specified for managing the aggregation of computations performed by the hardware accelerators 714. The accelerators 714 can be specified for deploying one or more machine learning models, such as large generative models like LLMs, LFMs, and/or LGMs. Example processors 710 can include central processing units (CPUs), graphic processing units (GPUs), and/or field-programmable gate arrays (FPGAs). Example accelerators 714 can also include GPUs and/or FPGAs as well as application-specific integrated circuits (ASICs), such as tensor processing units (TPUs) or wafer scale engines (WSEs).

The memory 712 can store information accessible by the processors 710 and/or accelerators 714, including instructions 716 that can be executed by the processors 710 and/or accelerators 714. The memory 712 can also include data 718 that can be retrieved, manipulated, or stored by the processors 710 and/or accelerators 714. The memory 712 can be any type of transitory or non-transitory computer readable medium capable of storing information accessible by the processors 710 and/or accelerators 714, such as volatile or non-volatile memory. Example memory 712 can include high bandwidth memory (HBM), static random access memory (SRAM), dynamic random access memory (DRAM), synchronous dynamic random access memory (SDRAM), flash memory, and/or read only memory (ROM).

The instructions 716 can include one or more instructions that, when executed by the processors 710 and/or accelerators 714, cause the one or more processors 710 and/or accelerators 714 to perform actions defined by the instructions 716. The instructions 716 can be stored in object code format for direct processing by the processors 710 and/or accelerators 714, or in other formats including interpretable scripts or collections of independent source code modules that are interpreted on demand or compiled in advance.

The data 718 can be retrieved, stored, or modified by the processors 710 and/or accelerators 714 in accordance with the instructions 716. The data 718 can be stored in computer registers, in a relational or non-relational database as a table having a plurality of different fields and records, or as JSON, YAML, proto, or XML documents. The data 718 can also be formatted in a computer-readable format such as, but not limited to, binary values, ASCII, or Unicode. Moreover, the data 718 can include information sufficient to identify relevant information, such as numbers, descriptive text, proprietary codes, pointers, references to data stored in other memories, including other network locations, or information that is used by a function to calculate relevant data.

The client computing device 704 can be configured similarly to the server computing device 702, with one or more processors 722, memory 724, instructions 726, and data 728. The client computing device 704 can also include a user input 730 and a user output 732. The user input 730 can include any appropriate mechanism or technique for receiving input from a user, such as keyboard, mouse, mechanical actuators, soft actuators, touchscreens, microphones, and sensors. The user output 732 can include any appropriate mechanism or technique for providing information to a platform user of the client computing device 704. For example, the user output 732 can include a display for displaying at least a portion of data received from one or more of the server computing devices 702. As another example, the user output 732 can include an interface between the client computing device 704 and one or more of the server computing devices 702. As yet another example, the user output 732 can include one or more speakers, transducers, or other audio outputs, or haptic interfaces or other tactile feedback that provides non-visual and non-audible information to the platform user of the client computing device 704.

Although FIG. 7 illustrates the processors 710, 722, the memories 712, 724, and the accelerators 714 as being within the respective computing devices 702, 704, components described herein can include multiple processors, memories, and accelerators that can operate in different physical locations and not within the same computing device. For example, some of the instructions 716, 726 and the data 718, 728 can be stored on a removable SD card and others within a read-only computer chip. Some or all of the instructions 716, 726 and data 718, 728 can be stored in a location physically remote from, yet still accessible by, the processors 710, 722 and/or accelerators 714. Similarly, the processors 710, 722 and/or accelerators 714 can include a collection of processors and/or accelerators that can perform concurrent and/or sequential operations. The computing devices 702, 704 can each include one or more internal clocks providing timing information, which can be used for time measurement for operations and programs run by the computing devices 702, 704.

One or more of the server computing devices 702 can be configured to receive requests to process data from the client computing device 704, such as part of training and/or serving a machine learning model. The server computing devices 702 can receive the request, process the request, and, in response, generate output data, such as a response to the request for training and/or serving a machine learning model.

Figure 8:
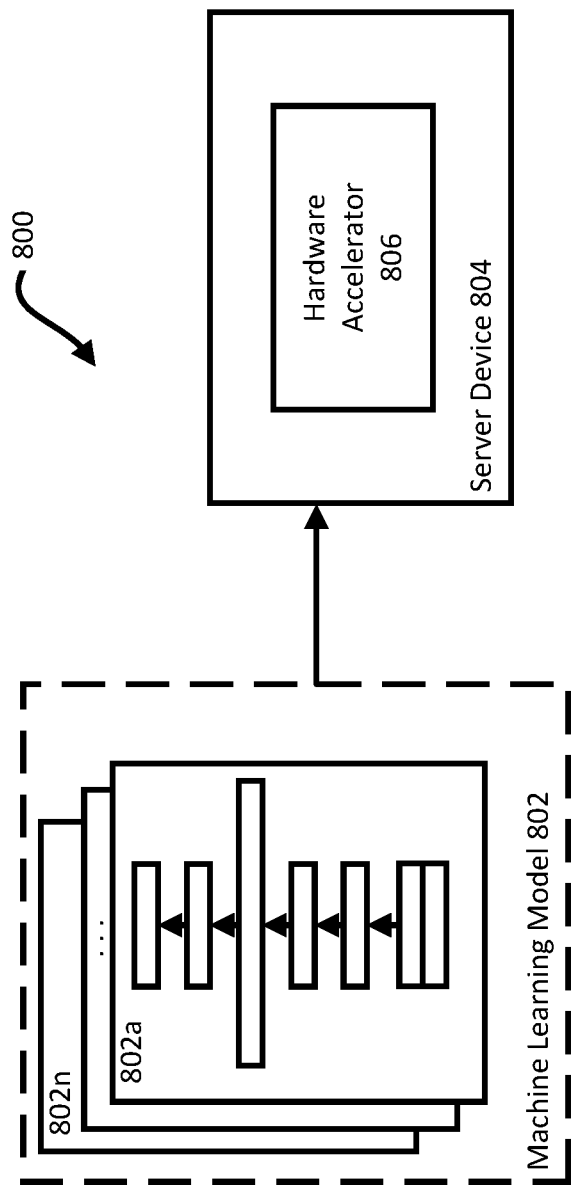
FIG. 8 depicts a block diagram illustrating one or more machine learning model architectures according to aspects of the disclosure.

FIG. 8 depicts a block diagram 800 illustrating one or more machine learning model architectures 802, more specifically 802a-n for each architecture, for deployment in a server computing device 804 housing one or more hardware accelerators 806 on which the deployed machine learning models 802 will execute. The server computing device 804 can correspond to any of the server computing devices 702 as depicted in FIG. 7. The hardware accelerator 806 can be any type of processor, such as a CPU, GPU, FPGA, and/or ASIC, such as a TPU or WSE.

An architecture 802 of a machine learning model can refer to characteristics defining the model, such as characteristics of layers for the model, how the layers process input, or how the layers interact with one another. The architecture 802 of the machine learning model can also define types of operations performed within each layer. One or more machine learning model architectures 802 can be generated that can output results. Example model architectures 802 can correspond to large generative models, such as LLMs, LFMs, and/or LGMs.

The machine learning models can be trained according to a variety of different learning techniques. Learning techniques for training the machine learning models can include supervised learning, unsupervised learning, semi-supervised learning, and reinforcement learning techniques. For example, training data can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

Referring back to FIG. 7, the devices 702, 704 can be capable of direct and indirect communication over the network 708. For example, using a network socket, the client computing device 704 can connect to a service operating using the server computing device 702 through an Internet protocol. The devices 702, 704 can set up listening sockets that may accept an initiating connection for sending and receiving information. The network 708 can include various configurations and protocols including the Internet, World Wide Web, intranets, virtual private networks, wide area networks, local networks, and private networks using communication protocols proprietary to one or more companies. The network 708 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® or 5G standard for wireless broadband communication. The network 708, in addition or alternatively, can also support wired connections between the devices 702, 704, including over various types of Ethernet connection.

Although three server computing devices 702, a client computing device 704, and a storage device 706 are shown in FIG. 7, it is understood that the example environment 700 can be implemented according to any number of server computing devices 702, client computing device 704, and storage devices 706. The example environment 700 can be implemented according to a variety of different configurations and quantities of computing devices, including in paradigms for sequential or parallel processing, over a distributed network of multiple devices.

Figure 9:
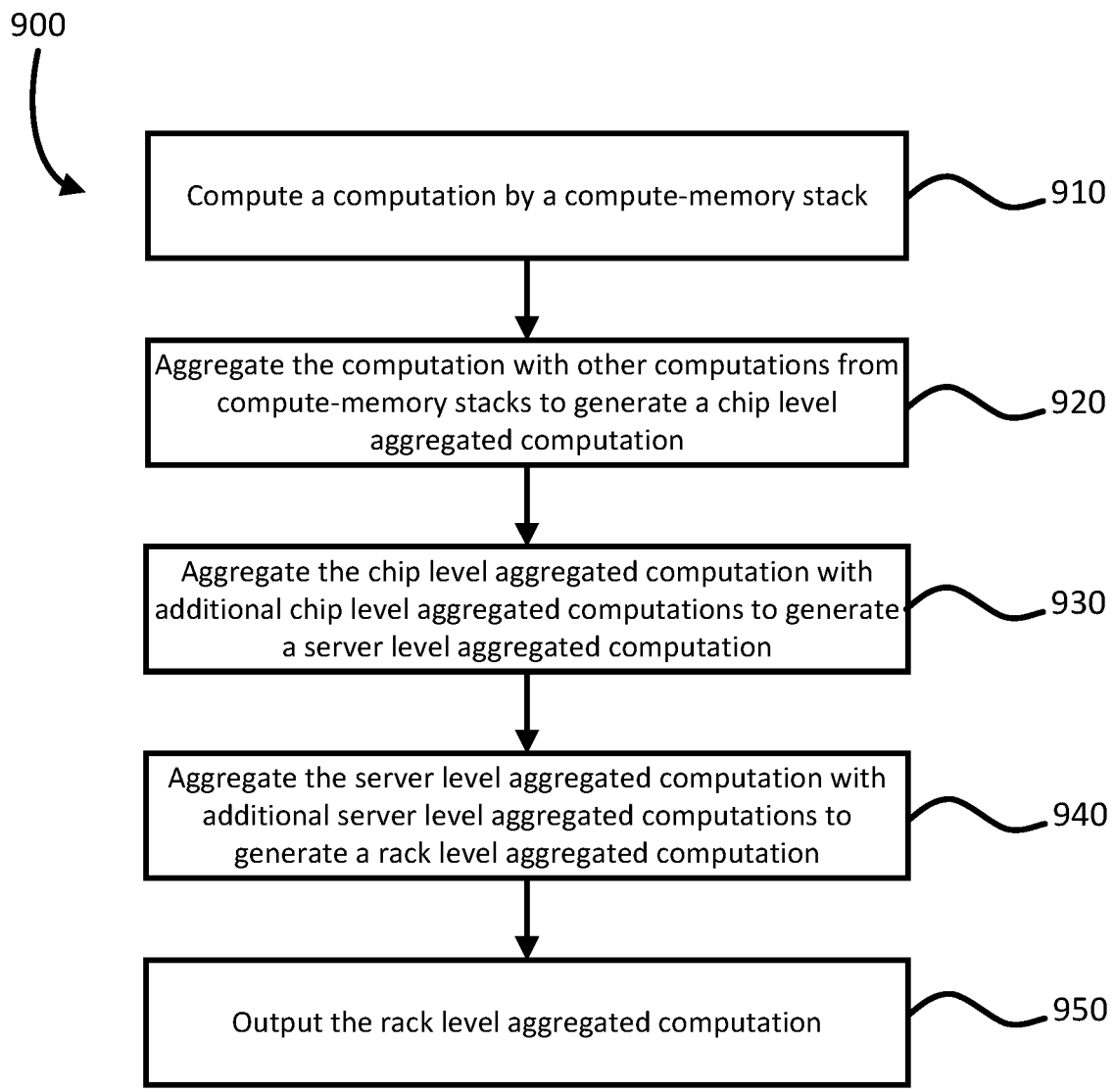
FIG. 9 depicts a flow diagram of an example process for processing computations in a tree-based network architecture according to aspects of the disclosure.

FIG. 9 depicts a flow diagram of an example process 900 for processing computations in a tree-based network architecture. The example process can be performed on a system of one or more processors in one or more locations, such as the tree-based network architecture 100 as depicted in FIG. 1. The tree-based network architecture 100 can be utilized for training and/or serving machine learning models, such as large model processing units, with fewer hops resulting in lower latency.

As shown in block 910, the tree-based network architecture 100 can compute a computation by a compute-memory stack. The compute-memory stack can be one of a plurality of compute-memory stacks connected to an I/O die in a multi-chip package. The compute-memory stack can include a plurality of memory die stacked on a compute die. The compute-memory stack can compute a partial sum as the computation.

As shown in block 920, the tree-based network architecture 100 can aggregate the computation with other computations from compute-memory stacks in the multi-chip package to generate a chip level aggregated computation. The aggregation can be performed by the I/O die in the multi-chip package. The aggregation can be at least one of an all-reduce, reduce, reduce-scatter, broadcast, multi-cast, and/or barrier operation.

As shown in block 930, the tree-based network architecture 100 can aggregate the chip level aggregated computation with other chip level aggregated computations from other multi-chip packages in a server to generate a server level aggregated computation. The aggregation can be performed by an I/O die in a server level aggregator. The aggregation can be at least one of an all-reduce, all-gather, and/or all-broadcast operation.

As shown in block 940, the tree-based network architecture 100 can aggregate the server level aggregated computation with other server level aggregated computations from other servers in a rack to generate a rack level aggregated computation. The aggregation can be performed by an I/O die in a rack level aggregator. The aggregation can be at least one of an all-reduce, reduce, reduce-scatter, broadcast, multi-cast, and/or barrier operation.

As shown in block 950, the tree-based network architecture 100 can output the rack level aggregated computation. The tree-based network architecture 100 can output the rack level aggregated computation back to at least one of the plurality of compute-memory stacks or to another network architecture for further processing.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A tree-based network architecture comprising:
    a server comprising a plurality of multi-chip packages connected to a server level aggregator;
    the multi-chip packages each comprising a plurality of compute-memory stacks connected to a chip level input/output (I/O) die, each chip level I/O die configured to aggregate computations performed by the compute-memory stacks to generate a chip level aggregated computation and output the chip level aggregated computation to the server level aggregator; and
    the server level aggregator comprising a server level I/O die configured to aggregate the chip level aggregated computation from each of the plurality of multi-chip packages to generate a server level aggregated computation and output the server level aggregated computation.

2. The architecture of claim 1, further comprising a rack comprising the server and a plurality of additional servers connected to a rack level aggregator, the rack level aggregator comprising a rack level I/O die configured to aggregate the server level aggregated computation from the server and each of the plurality of additional servers to generate a rack level aggregated computation and output the rack level aggregated computation.

3. The architecture of claim 1, wherein the server level aggregated computation is output to at least one of the plurality of compute-memory stacks.

4. The architecture of claim 1, wherein the server level aggregated computation is output to an additional server.

5. The architecture of claim 1, wherein a compute-memory stack of the plurality of compute-memory stacks comprises a plurality of memory die stacked on top of a compute die.

6. The architecture of claim 1, wherein a multi-chip package of the plurality of multi-chip packages comprises a spare compute-memory stack.

7. The architecture of claim 1, wherein the server level aggregator further comprises a plurality of downstream ports and an upstream port.

8. The architecture of claim 7, wherein the number of the plurality of downstream ports corresponds to the number of the multi-chip packages.

9. The architecture of claim 7, wherein the server level aggregator further comprises a spare downstream port and a spare upstream port.

10. The architecture of claim 7, wherein the server level aggregator is configured to perform at least one of an all-reduce, an all-gather, or an all-broadcast operation to aggregate the chip level aggregated computation.

11. The architecture of claim 1, wherein the chip level I/O dies are packaged with respective multi-chip packages and the server level I/O die is packaged with the server level aggregator.

12. The architecture of claim 1, wherein the computations performed by the compute-memory stacks are for at least one of serving or training a machine learning model.

13. The architecture of claim 12, wherein the machine learning model is a large model processing unit.

14. A method for processing computations in a tree-based network architecture, the method comprising:
    computing, by each of a plurality of compute-memory stacks in a multi-chip package, a respective computation;
    aggregating, by a chip level input/output (I/O) die connected to the plurality of compute-memory stacks in the multi-chip package, the respective computations to generate a chip level aggregated computation;
    aggregating, by a server level I/O die of a server level aggregator in a server, the chip level aggregated computation with additional chip level aggregated computations to generate a server level aggregated computation; and
    outputting, by the server level aggregator, the server level aggregated computation.

15. The method of claim 14, further comprising:
    aggregating, by a rack level I/O die of a rack level aggregator in a rack, the server level aggregated computation with additional server level aggregated computations to generate a rack level aggregated computation; and
    outputting, by the rack level aggregator, the rack level aggregated computation.

16. The method of claim 14, further comprising outputting the server level aggregated computation to at least one of the plurality of compute-memory stacks.

17. The method of claim 14, further comprising outputting the server level aggregated computation to an additional server.

18. The method of claim 14, wherein aggregating the respective computations to generate a chip level aggregated computation comprises performing at least one of an all-reduce, an all-gather, or an all-broadcast operation.

19. A large model processing unit comprising a plurality of tree-based network architectures, each of the tree-based network architectures comprising:
    a server comprising a plurality of multi-chip packages connected to a server level aggregator;
    the multi-chip packages each comprising a plurality of compute-memory stacks connected to a chip level input/output (I/O) die, each chip level I/O die configured to aggregate computations performed by the compute-memory stacks to generate a chip level aggregated computation and output the chip level aggregated computation to the server level aggregator; and the server level aggregator comprising a server level I/O die configured to aggregate the chip level aggregated computation from each of the plurality of multi-chip packages to generate a server level aggregated computation and output the server level aggregated computation.

20. The large model processing unit of claim 19, wherein each of the tree-based network architectures further comprises a rack comprising the server and a plurality of additional servers connected to a rack level aggregator, the rack level aggregator comprising a rack level I/O die configured to aggregate the server level aggregated computation from the server and each of the plurality of additional servers to generate a rack level aggregated computation and output the rack level aggregated computation.

* * * * *